United States Patent [19]

Italiano

[11] Patent Number: 4,841,805
[45] Date of Patent: Jun. 27, 1989

[54] ADJUSTABLE CABLE END COUPLING

[75] Inventor: Anthony J. Italiano, Waukesha, Wis.

[73] Assignee: MPC Technologies Co., Moberly, Mo.

[21] Appl. No.: 168,134

[22] Filed: Mar. 14, 1988

[51] Int. Cl.⁴ .............................................. F16C 1/10
[52] U.S. Cl. ................... 74/501.5 R; 74/502; 74/500.5; 74/531
[58] Field of Search ............... 74/501.5 R, 502, 503, 74/500.5, 501.6, 502.4, 502.6, 527, 531

[56] References Cited

U.S. PATENT DOCUMENTS

| | | | |
|---|---|---|---|
| 3,393,578 | 7/1968 | Tschanz | 74/502 |
| 3,513,719 | 5/1970 | Tschanz | 74/500.5 |
| 3,587,341 | 6/1971 | Fiddler | 74/502 |
| 3,710,645 | 1/1973 | Bennett | 74/502 |
| 4,079,950 | 3/1978 | Langford | 74/502 |
| 4,611,502 | 9/1986 | Gregory | 74/502 |
| 4,688,445 | 8/1987 | Spease et al. | 74/502 X |
| 4,694,706 | 9/1987 | Lichtenberg et al. | 74/501.5 R |

FOREIGN PATENT DOCUMENTS

| | | | |
|---|---|---|---|
| 2590338 | 5/1987 | France | 74/501.5 R |
| 2160946 | 1/1986 | United Kingdom | 74/502 |

*Primary Examiner*—Vinh Luong
*Attorney, Agent, or Firm*—James L. Kirschnik

[57] ABSTRACT

An adjustable cable end coupling includes an elongated female coupling having an internal bore and containing a resilient locking tab having teeth extending into the interior of the coupling bore. An elongated male insert attached to a cable end and having a plurality of circumferential teeth formed therein is insertable within the coupling bore so that the resilient locking tab teeth engage the teeth of the male insert to hold it in a set position within the coupling. Manual force on the insert may be used to overcome the locking forces of the resilient tab on the insert to permit adjustment of the relative position of the insert within the coupling.

16 Claims, 1 Drawing Sheet

ADJUSTABLE CABLE END COUPLING

BACKGROUND OF THE INVENTION

1. Field of the Invention

This invention relates to end fittings or couplings for cable assemblies which enable a device at one end of a cable assembly to move when the opposite end of the cable assembly is moved to a selected position. Such cable couplings are often used in the automotive industry where, for example, a temperature control lever within the vehicle is moved to select a position during defrosting, heating or air conditioning. The control lever typically moves one end of a cable connected at the other end to a movable baffle member which directs air flow as selected by the user. The cable itself is normally movable within a flexible conduit. Similar cable type controls are often found on common consumer products such as lawn mowers or snow blowers for throttle controls and many other common applications known in the art.

2. Description of the Prior Art

Cable controls typically use a flexible cable movably contained within a surrounding flexible conduit. The conduit may be formed from a coiled spring type steel to form a continuous internal passageway through which the cable is inserted. Additionally, plastic or wire reinforced plastic may be used as a conduit material. In a typical application, the conduit is clamped in a stationary position with one end of the cable attached to a movable object and the opposite end of the cable attached to a control such as a lever or other device. Movement of the control lever will move the cable axially within the cable housing and cause the object at the opposite end to be moved to a corresponding position. Typically, the actual cable ends are connected by clamps or other terminal end pieces to the control lever and the object to be moved. Often, it is desirable to permit adjustment of at least one cable end connector so that when the control lever is placed in a closed position in the case of an automotive heater, for example, the opposite end of the cable will be positioned to place the movable heater baffle in a corresponding closed position. The opposite extreme of motion of the baffle to a "defrost" position for example, may require some adjustment of the cable end position to insure that the control lever member is at the corresponding position for selecting defrosting. A common adjustable clamping device consists of a sliding metal spring clip which may be adjusted by exertion of manual force to move the clip on the cable. The disadvantage of such devices in their expense and unreliability in obtaining consistent adjustment forces. Another adjustment method provides for an adjustable conduit which may then vary the extent of travel of the cable ends.

SUMMARY OF THE INVENTION

It is an object of the present invention to provide an adjustable cable end coupling which may be easily fabricated by injection molding or similar processes.

Another object is to provide an adjustable cable end coupling which permits relatively easy manual adjustment of the cable end position relative to the coupling itself, or, to adjust the position of the conduit, so as to alter the travel of the cable itself.

To accomplish the foregoing objects and advantages of the present invention, a female coupling is provided with a resilient toothed or serrated locking portion extending into the interior of the coupling. The resilient locking member engages serrations or teeth formed in a male cable end member inserted within the tube. The male cable end member may be molded onto or otherwise attached to the end of a cable or its conduit and adjustment of the position of the male end member within the female coupling is effectuated by exerting within sufficient axially force to overcome the engagement force between the teeth of the resilient locking member and the male end member. Once in position, movement of the coupling can also move the cable.

DESCRIPTION OF A PREFERRED EMBODIMENT

Figure 1:
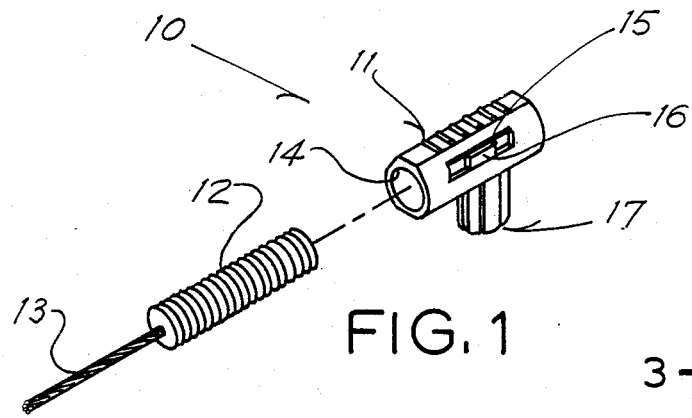
FIG. 1 is a perspective view of an adjustable cable end coupling assembly according to the invention.

Referring to FIG. 1, an adjustable cable end coupling assembly 10 comprises a generally tubular female coupling sleeve 11 and a male cable end member 12 attached to the end of a cable 13. The female coupling sleeve 11 includes a substantially smooth internal bore or a central aperture 14. In the side wall of the coupling 11, a window like opening or a side aperture 15 is provided which contains a resilient locking tab 16 whose function and relationship with be described hereinafter. Also extending radially from the coupling 11 is a connector portion 17.

Figure 2:
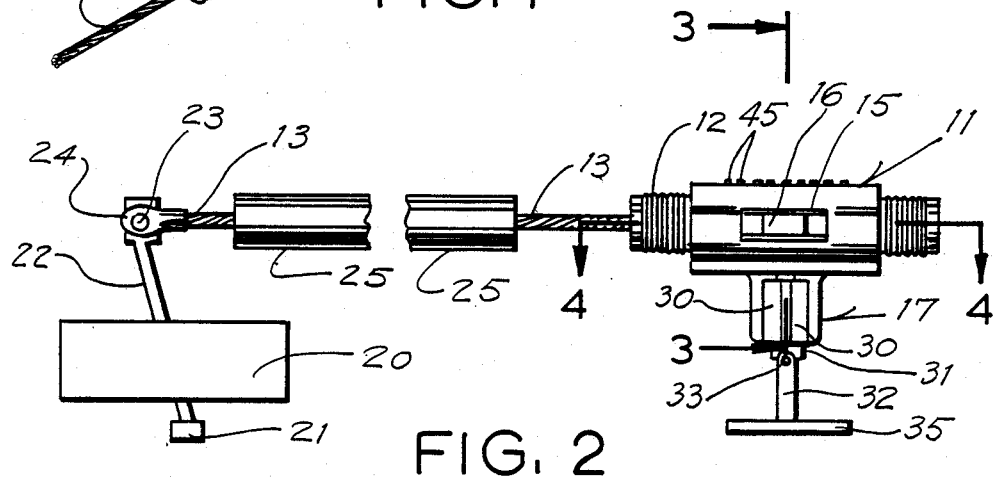
FIG. 2 schematically depicts a cable end coupling as used in practice.

A typical application of the adjustable cable end coupling assembly 10 is shown in FIG. 2 where an automobile heater control box 20 has a selector knob 21 attached to a pivoting control lever 22 which may be pivotably attached by means of a pin 23 and yoke 24 to the end of a cable 13. The cable 13 is contained within a flexible conduit or housing 25 with the opposite end of the cable 13 and male end member 12 inserted within the female coupling 11. The connector body 17 extending downward from the sleeve 11 can comprise a pair of split semicircular portions 30 which form a cavity for receiving a member 31 which may be pivotably attached to a lever 32 by means of a pivot pin 33 for moving a baffle member 35. The details of the heater control and baffle are provided merely for sake of example and have no bearing on the invention. It will be apparent to those skilled in the art that other types of devices could be controlled and the attaching connections to a controlling lever and device to be moved are design choices and may vary. As will be apparent in viewing FIG. 2, however, the degree of insertion of the male member 12 within the female coupling 11 will directly influence and provide an adjustment of the relative position of the coupling 11 on the end of cable 13.

Figure 3:
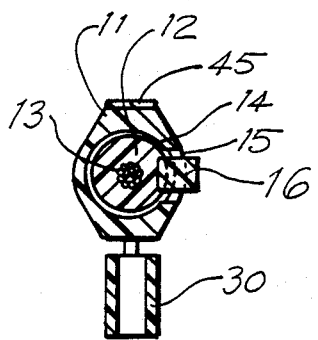
FIG. 3 is a view taken along line 3—3 of FIG. 2.
Figure 4:
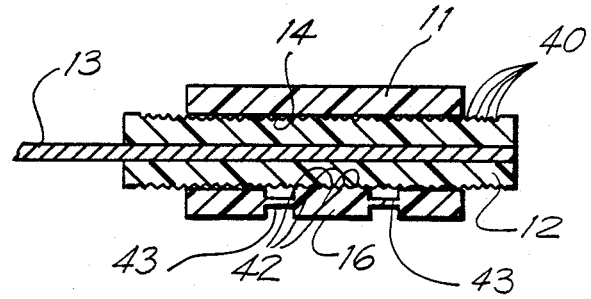
FIG. 4 is a view taken along line 4—4 of FIG. 2.

With reference to FIGS. 3 and 4, the adjustable nature of the invention is shown. Internal bore 14 is dimensioned so as to readily receive the male end member 12. The male member 12 has a substantially cylindrically elongate shape with a plurality of circumferential grooves or teeth 40 extending along its length. Locking tab 16 has similarly shaped locking teeth 42 which extend into the interior of the bore 14 and sized so as to engage the corresponding teeth 40 of the male member 12. Tab 16 is resiliently connected to the side wall of coupling 11 within the window 15 by means of flex tabs 43 which are integrally formed in the sidewall of coupling 11. The flex tabs 43 are preferably of a reduced size relative to tab 16 and permit a degree of elastic radical flexing so that forcing the male member 12 into the bore 14 will result in the interference of the teeth 40 and 42 causing the tab 16 to flex outwardly as member 12 is inserted. When the axial forces are removed from the member 12, teeth 40 and 42 will settle into engagement and lock the member 12 in position within coupling 11. Thus, if the position of the coupling 11 relative to the male cable end member 12 is desired to be adjusted, sufficient force is merely applied to member 12 to insert it further within bore 14 or withdraw it as desired. To assist in manually holding the coupling 11 stationary while moving the member 12, a plurality of protuberant nubs 45 may be formed along the upper edge of coupling 11 opposite the connector portion 17. Once adjusted, the male member 12 may be further locked in position by clamping tab 16 in place, glueing or fusing the pieces and thereby preventing further adjustment if desired.

In one embodiment of the invention, a coupling 11 was injection molded and formed from nylon type 6/6 having a sleeve length of 1.25 inches (3.175 cm.) and an internal bore of 0.345 inches (0.876 cm.) with the male member 12 being formed from an acetal material and molded directly onto the end of cable 13. The male member 12 had a maximum outside diameter of 0.340 inches (0.864 cm.) and a length of 2 inches (5.08 cm.) equally spaced teeth having a 0.046 inch (0.117 cm.) tooth width and a tooth height of 0.020 inches (0.051 cm.) used on both the resilient lock tab 16 and male member 12. This combination was found to permit manual adjustment of the degree of insertion of member 12 within the coupling 11 while maintaining sufficient locking forces for operating a heater control for a motor vehicle.

Figure 5:
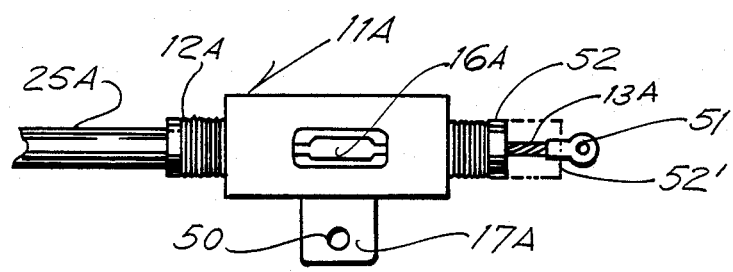
FIG. 5 is an alternate cable end coupling arrangement.

In FIG. 5 an alternate embodiment of the invention is shown in which numbers are used with the suffix "A" for ease of identification and reference. As seen in FIG. 5, the male member 12A is molded onto an end of cable conduit 25A and cable 13A is slidable within both the conduit 25A and the surrounding male member 12A. Coupling 11A is constructed and configured in an identical fashion except connector body 17A consists of a tab having a hole 50 which may be used to mount the coupling sleeve 11A in a fixed position on an object in any conventional manner not shown. Resilient lock tab 16A also permits the adjustment of male member 12A, however, in this case relative movement of member 12A results in changing the position of the end of the conduit 25A relative to the end of cable 13A. For illustration, a connecting eye 51 is attached to the end of cable 13A. Further extension of member 12A through the coupling 11A can result in a change of position of the end 52 of the male member 12A to a phantom position shown as 52'. Such movement will thus limit the extent of motion of the connecting eye 51 and any device connected to it by virtue of contact with the end 52 of member 12A.

It will be apparent to those skilled in the art that the alternate embodiment shown in FIG. 5 may be further varied in that rather than molding a male member 12A on conduit, serrations or locking teeth could be formed directly into the conduit end itself with the conduit end then functioning in the same manner as the male member 12A does.

As will also be apparent by those skilled in the art, many different kinds and grades of plastic materials and other types of materials could be utilized to form the invention. Without limitation, specific plastics might include acetal, polyethylene, polypropylene, ABS plastics, and of course nylon. In addition, the dimensional relationships, amounts of tooth overlap and interference between the teeth of the locking member and male member could be varied significantly to achieve a particular desired end result without departing from the scope or intent of the invention. The degree of tooth interference, angle of the tooth faces, amount of tooth spacing and resiliency of the particular material utilized to make both the sleeve and male member will affect the release forces necessary to achieve adjustment and the locking forces which may be generated during use. Similarly, in some applications, a cable may be held in a fixed position with the male member attached to the conduit and a coupling device utilized in conjunction with movement of the conduit for controlling a particular device or apparatus.

While the application of the invention to the automotive field is one particularly well suited use, the present invention could be utilized with many other devices having cable controls.

Furthermore, while a cylindrically shaped male member 12 has been described and is preferred because it permits rotation of the coupling 11 on the insert 12, in some cases a sliding insert configured to avoid rotation within the coupling might be preferred in which case the teeth on the insert 12 would be limited to an area of engagement with the locking portion 16.

Accordingly, while a preferred embodiment of the invention has thus been described, the scope of the invention is not to be limited thereby but is to be taken solely from an interpretation of the claims which follow.

I claim:

1. An adjustable cable end coupling and flexible control cable comprising:
    a. a flexible control cable movably supported in a flexible conduit and having an end of said cable extending from an end of said conduit;
    b. an elongated male end member affixed to said cable end, said member having a substantially cylindrical shape with its central axis substantially parallel to the path of movement of said cable;
    c. said male end member having a plurality of spaced circumferential teeth formed along its peripheral surface;
    d. female coupling means for receiving and permitting rotation on said male end member and including means for attaching said coupling to an article;
    e. said female coupling means having a central aperture for movably receiving said male end member, said and a peripheral side wall comprising an elastically deformable material; and,
    f. said side wall including a side aperture formed therein and having resilient lock means contiguously formed as one-piece from said side wall within said side aperture for engaging a portion of and retaining said male end member in a preselected position within said coupling means.

2. A device as set forth in claim 1, wherein said lock means is elastically deformable radially outward from said male member under the influence of axial force on said male member relative to said coupling means whereby the position of said male member within said coupling may be adjusted.

3. A device as set forth in claim 2, wherein said lock means includes a plurality of spaced teeth extending within said central aperture into engagement with a portion of said circumferential teeth.

4. A device as set forth in claim 3, wherein said female coupling means comprises a molded plastic or nylon material.

5. A device as set forth in claim 4, wherein said male end member comprises a molded plastic or nylon material.

6. A device as set forth in claim 5, wherein said female coupling means having a plurality of spaced protuberances formed thereon for manually gripping said female means.

7. A device as set forth in claim 1, wherein said female coupling means having a plurality of spaced protuberances formed thereon for manually gripping said female means.

8. A device as set forth in claim 1, wherein said female coupling means comprises a molded plastic or nylon material.

9. A device as set forth in claim 1, wherein said male end member comprises a molded plastic or nylon material.

10. A device as set forth in claim 1, wherein said lock means includes a plurality of spaced teeth extending within said central aperture into engagement with a portion of said circumferential teeth.

11. An adjustable cable end coupling and flexible control cable comprising:
   a. a flexible control cable movably supported in a flexible conduit and having an end of said cable extending from an end of said conduit;
   b. said conduit end, having a substantially cylindrical shape with its central axis substantially parallel to the path of movement of said cable, and having a plurality of spaced circumferential teeth formed along its peripheral surface adjacent to said conduit end;
   c. female coupling means for receiving said conduit end and including means for attaching said coupling to an article;
   d. said female coupling means having a central aperture for movably receiving and permitting rotation on said conduit end, and a peripheral coupling side wall comprising an elastically deformable material; and,
   e. said side wall including a side aperture formed therein and having resilient lock means contiguously formed as one-piece from said side wall within said side aperture for engaging a portion of and retaining said conduit end in a preselected position within said coupling means.

12. A device as set forth in claim 11, wherein said lock means is elastically deformable radially outward from said conduit end under the influence of axial force on said conduit end relative to said coupling means whereby the position of said conduit end within said coupling may be adjusted.

13. A device as set forth in claim 12, wherein said lock means includes a plurality of spaced teeth extending within said central aperture into engagement with a portion of said circumferential teeth.

14. An adjustable cable end coupling and flexible control cable comprising:
   a. a flexible control cable movably supported in a flexible conduit and having an end of said cable extending from an end of said conduit;
   b. an elongated male end member affixed to said conduit end and having an internal passageway through which said cable may movably pass, said end member having a substantially cylindrical shape with its central axis substantially parallel to the path of movement of said cable;
   c. said male end member having a plurality of spaced circumferential teeth formed along its peripheral surface;
   d. female coupling means for receiving said male end member and including means for attaching said coupling to an article;
   e. said female coupling means having a central aperture for movably receiving and permitting rotation on said male end member, and a peripheral coupling side wall comprising an elastically deformable material; and,
   f. said side wall including a side aperture formed therein and having resilient lock means contiguously formed as one-piece from said side wall within said side aperture for engaging a portion of and retaining said male end member in a preselected position within said coupling means.

15. A device as set forth in claim 14, wherein said lock means is elastically deformable radially outward from said male member under the influence of axial force on said male member relative to said coupling means whereby the position of said male member within said coupling may be adjusted.

16. A device as set forth in claim 15, wherein said lock means includes a plurality of spaced teeth extending within said central aperture into engagement with a portion of said circumferential teeth.

* * * * *